United States Patent
Audren et al.

(10) Patent No.: US 7,026,746 B2
(45) Date of Patent: Apr. 11, 2006

(54) VALVE CONTROL DEVICE

(75) Inventors: Jean Thierry Audren, St Remy les Chevreuse (FR); Etienne Merlet, Montigny-le-Bretonneux (FR); Jérôme Meleard, Courcouronnes (FR); Charles Mangeot, Antony (FR)

(73) Assignee: Sagem SA, Paris (FR)

( * ) Notice: Subject to any disclaimer, the term of this patent is extended or adjusted under 35 U.S.C. 154(b) by 64 days.

(21) Appl. No.: 10/678,580

(22) Filed: Oct. 3, 2003

(65) Prior Publication Data

US 2005/0006981 A1    Jan. 13, 2005

(30) Foreign Application Priority Data

Oct. 3, 2002   (FR) ..................... 0212230

(51) Int. Cl.
*H02N 2/00*      (2006.01)
*H01L 41/08*    (2006.01)

(52) U.S. Cl. .................... 310/328; 310/323.17
(58) Field of Classification Search ............. 310/324, 310/328, 367, 368, 348, 344–345, 323.17; 367/163
See application file for complete search history.

(56) References Cited

U.S. PATENT DOCUMENTS

| | | | |
|---|---|---|---|
| 5,742,561 A * | 4/1998 | Johnson | 367/157 |
| 6,246,552 B1 | 6/2001 | Soeno et al. | 360/294.4 |
| 6,291,928 B1 * | 9/2001 | Lazarus et al. | 310/328 |
| 6,294,859 B1 * | 9/2001 | Jaenker | 310/328 |
| 6,371,415 B1 * | 4/2002 | Lorkowski et al. | 244/214 |
| 6,411,009 B1 * | 6/2002 | Jaenker | 310/316.01 |
| 6,545,384 B1 * | 4/2003 | Pelrine et al. | 310/309 |
| 6,717,333 B1 * | 4/2004 | Hermle et al. | 310/328 |
| 6,836,056 B1 * | 12/2004 | Oudshoorn et al. | 310/328 |
| 2001/0004181 A1 | 6/2001 | Jaenker | 310/328 |

FOREIGN PATENT DOCUMENTS

DE       10060018    6/2003

* cited by examiner

*Primary Examiner*—Darren Schuberg
*Assistant Examiner*—J. Aguirrechea
(74) *Attorney, Agent, or Firm*—Blakely Sokoloff Taylor & Zafman

(57) ABSTRACT

The invention relates to a device for displacing a moving part along a longitudinal axis relative to a housing, said device being symmetrical about a plane extending longitudinally relative to the moving part, the device comprising two structures that are secured to said moving part and elements of active material comprising at least two blocks extending between inside walls of each structure, with the elongation directions of the blocks being antisymmetrical about an axis substantially perpendicular to the displacement axis of the moving part, wherein the structures are flexible and suitable for displacing the moving part by deforming as a function of the elongation of the blocks.

26 Claims, 4 Drawing Sheets

VALVE CONTROL DEVICE

GENERAL TECHNICAL FIELD

The present invention relates to devices for controlling hydraulic valves or slides, in particular in hydraulic circuits, e.g. in the aviation or automotive fields.

More precisely, the invention relates specifically to devices for controlling hydraulic circuit valves enabling the valve to move progressively, and providing greater safety in use over a wide range of temperatures.

STATE OF THE ART

Devices for controlling valves in hydraulic circuits are already known in the state of the art.

Such control devices are used in numerous systems, for example in brake servo-control systems, or in flight control actuators in the field of aviation.

Certain devices in the state of the art are intended to adjust the hydraulic flow rate of the circuit to a desired level.

In general, hydraulic flow rate is controlled by moving a needle disposed in an orifice, the position of the needle in the orifice and the displacement thereof serving to regulate the flow rate of the liquid.

The control systems most commonly in use at present are electromagnetic. They are large in volume and they consume a large amount of energy.

Certain valve control systems make use of piezo-electric actuators for moving the needle.

However, those devices do not give full satisfaction.

The needle is moved along the elongation axis of the piezoelectric material. In that type of configuration, a change in the volume of the piezoelectric material as a function of temperature leads to instability in the position of the needle when the temperature varies over a large range. Furthermore, most systems including such a piezoelectric device present displacement of the operating zero position that is greater than the operating range.

SUMMARY OF THE INVENTION

The invention seeks to mitigate those drawbacks.

An object of the invention is to propose a device which presents great stability over a large range of temperatures, typically −55° C. to +80° C.

Another object of the invention is to propose a system enabling valves to be actuated with a force that is typically equal to 50 newtons (N), over a displacement amplitude that is typically of ±0.5 millimeters (mm).

Finally, an object of the invention is to propose a valve control device that is compact.

To this end, the invention provides a device for displacing a moving part along a longitudinal axis relative to a housing, said device being symmetrical about a plane extending longitudinally relative to the moving part, the device comprising two structures that are secured to said moving part and elements of active material comprising at least two blocks extending between inside walls of each structure, with the elongation directions of the blocks being antisymmetrical about an axis substantially perpendicular to the displacement axis of the moving part, wherein the structures are flexible and suitable for displacing the moving part by deforming as a function of the elongation of the blocks.

The invention advantageously further comprises the following characteristics taken singly or in any technically feasible combination:
  each structure comprises a plate extending substantially parallel to the displacement axis of the moving part and oblique pushers integral with the plate, at least one pair of pushers being secured to the moving part at their ends via at least one junction block;
  each structure includes portions of narrow section between the plate and the oblique pushers, and between the oblique pushers and the junction blocks connected to the moving part, these portions of narrow section being suitable for imparting flexibility to each structure;
  each structure comprises a plate extending substantially parallel to the displacement axis of the moving part and oblique pushers fitted to said plate, at least one pair of pushers being secured to the moving part at their ends via at least one junction block, the connection between the plate and the pushers and/or the connection between the pushers and the junction block being a resilient hinge without play constituted by at least one connecting blade;
  the device includes means suitable for prestressing the displacement means between the plates;
  the pushers are geometrically antisymmetrical relative to a plane perpendicular to the plates;
  one junction block is connected to the moving part and the other junction block is fixed relative to the housing external to the structures, the fixed block being secured to a rod coming into abutment against a screw for adjusting the displacement zero position of the moving part;
  the pushers are geometrically symmetrical about a plane perpendicular to the plates;
  both junction blocks are connected to the moving part;
  the device includes at least one diaphragm on either side of the junction blocks, the diaphragms being flexible along the displacement axis of the moving part and stiff transversely relative thereto;
  the diaphragms are suitable for providing sealing between the moving part and the housing;
  the housing is filled with a counterpressure liquid;
  at least one diaphragm includes bellows;
  the device includes at least one expansion chamber for the filler liquid; and
  each expansion chamber includes a cutout constituting a portion of the wall of the housing, said cutout being connected to the housing by bellows;

BRIEF DESCRIPTION OF THE FIGURES

Other characteristics, objects, and advantages of the invention appear from the following description which is purely illustrative and non-limiting, and which should be read with reference to the accompanying drawings, in which.

DETAILED DESCRIPTION

Figure 1:
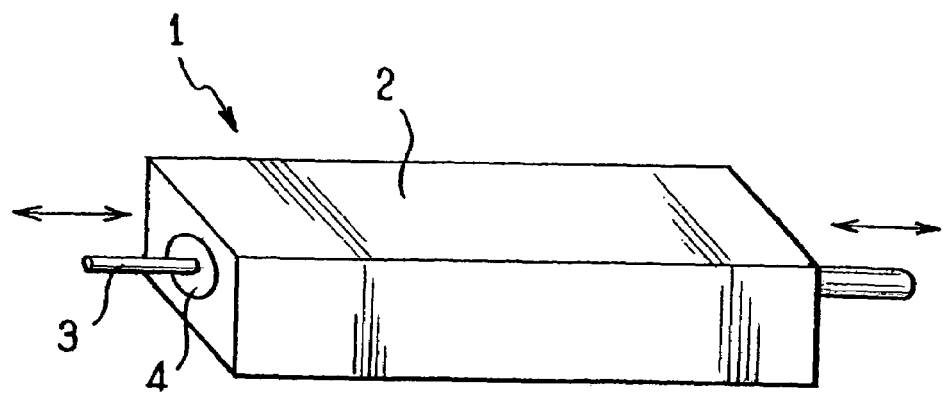
FIG. 1 is a diagrammatic perspective view of one possible embodiment of a valve control device of the invention.

FIG. 1 is a diagram of a possible embodiment of a valve control device 1 comprising an outer housing 2 in which there is disposed a rod 3 extending along a substantially longitudinal axis of the housing 2.

The housing 2 may be of any shape, but it is preferably in the form of a rectangular parallelepiped.

The rod 3 is movable in translation along the longitudinal axis of the housing 2. At least one of its ends is connected to a valve in a hydraulic circuit. Double-headed arrows visible in FIG. 1 represent displacement of the rod 3 relative to the housing 2.

Sealing is provided between the housing 2 and the rod 3 by means 4 suitable for securing the rod 3 and the housing 2 together in such a manner as to guarantee leak-tightness while nevertheless ensuring that the rod 3 can be displaced relative to the housing 2. By way of example, the sealing means comprise a diaphragm 4 closely surrounding the rod 3 and also connected to the housing 2. The diaphragm 4 is flexible and allows the rod 3 to be displaced longitudinally in the housing 2.

When the valve is opened or closed to a greater or lesser extent, fluid flows around the housing 2, for example.

Means for actuating the rod 3 are contained within the housing 2.

Figure 2:
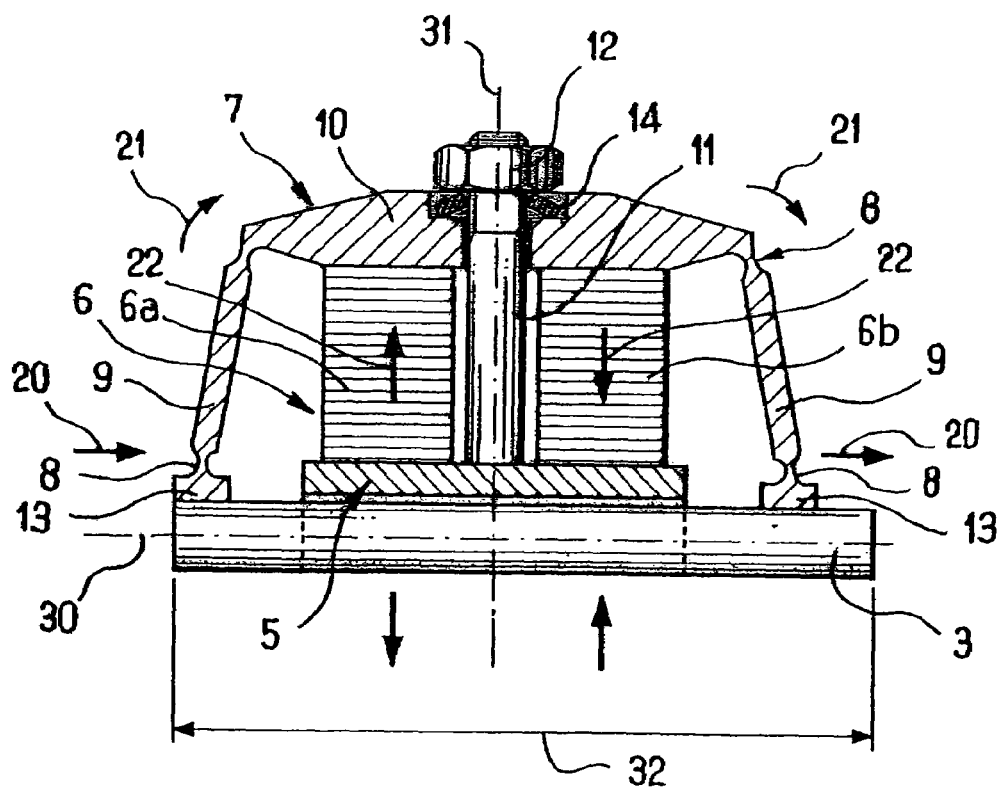
FIG. 2 is a diagrammatic longitudinal section view through a possible embodiment of a valve displacement device, said device being located inside the device shown in FIG. 1.

FIG. 2 is a diagram of a first possible embodiment of means for actuating the rod 3. The actuator means are symmetrical about a plane 30 containing the longitudinal axis of the rod 3. Consequently, this figure shows only the top half of the actuator means, above the plane 30. The entire system is shown in longitudinal section in FIG. 3. FIGS. 4a and 4b show a portion of the actuator system in a perspective view.

With reference to FIGS. 2 to 4b, the actuator means comprise means 5 for causing the rod 3 to slide longitudinally. By way of example, the means 5 comprise a part that is substantially in the form of a thick plate 5 constituting a rectangular parallelepiped and pierced by a hole surrounding the rod 3.

The rod 3 may equally well be circular or square in section.

The means 5 are fixed relative to the housing 2 and are fixed to its inside walls. By way of example, the part 5 is fixed relative to the inside wall of the housing 2 via one of its sides that are parallel to the axis of the rod 3.

Means for displacing the rod 3 enable it to be caused to slide in the means 5.

In the diagram of FIG. 2, the displacement means comprise means 6 for deforming a structure 7 secured to the rod 3. Naturally, the device 1 has two structures 7 on opposite sides of the plane 30.

In FIG. 2, the top structure 7 is substantially in the form of a bridge surrounding the central portion of the rod 3, the ends of the rod 3 projecting from the structure 7 and the housing 2 in order to actuate valves.

The structure 7 comprises a top plate 10 extending in a rest position substantially parallel to and spaced apart from the axes of the rod 3 and the part 5. The top plate 10 is substantially in the form of a rectangular parallelepiped extending substantially parallel to the top surface of the part 5. For greater clarity, this top plate 10 is not shown in FIGS. 4a and 4b.

The structure 7 also has lateral pushers 9 made integrally with the top plate 10 and extending obliquely towards the rod 3. The ends 13 of the pushers 9 are secured to the rod 3 and form connection blocks, for example. FIGS. 4a and 4b show two possible embodiments of the pushers 9. In FIG. 4a, the right section of the pushers tapers going from the plate 10 towards the blocks 13. In FIG. 4b, the right section of the pushers 9 is constant and square in shape. Other embodiments are also possible. For example, the dimensions of the plate 10 and of the pushers 9 along an axis perpendicular to FIGS. 2 and 3 can be the same. Dimensioning depends on the section of the rod 3.

The structure 7 has portions 8 of narrow section at the junctions between the top plate 10 and the oblique pushers 9, and also at the junctions between the oblique pushers 9 and the blocks 13. The portions of narrow section 8 thus form locations in the part 7 that are highly flexible, thereby forming hinge type means.

The deformation means 6 deform the structure 7 which in turn moves the rod 3 in the means 5.

With reference to FIG. 2, the means 6 comprise blocks of active materials 6a and 6b connected firstly to the outside surface of the means 5 and secondly to the inside face of the top plate 10 of the structure 7. The blocks 6a and 6b may equally well be circularly symmetrical in radial section or they may be square. Their ends bear against two plane surfaces. The first plane surface is the bottom wall of the top plate 10. The second plane surface is the top wall of the means 5.

Prestress means 11 enable the deformation means 6 to be prestressed against the parts 5 and 7. For example, the prestress means comprise a threaded rod 11 co-operating with a nut 12 and a washer 14. The nut 12 presses the washer 14 against the outside face of the top plate 10 in order to prestress the parts 7, 6, and 5 against one another.

The active materials 6a and 6b may be of the electrostrictive, magnetostrictive, or piezoelectric type. They are advantageously made of piezoelectric materials.

There follows a description of the mechanism for deforming the structure 7 and displacing the rod 3.

The elongation axis of the active materials 6a and 6b is normal to the axes of the rod 3 and the hollow part 5. Similarly, the elongation axis of the active materials 6a and 6b is normal to the top plate 10 of the structure 7.

In FIG. 2, arrows 22 show the elongation directions of the active materials 6a and 6b during a first stage of applying an electrical voltage.

The arrows 22 thus show that during the first stage, the active material 6a elongates positively, whereas during the same stage, the active material 6b does not elongate or is subjected to negative elongation.

This difference in elongation causes the top plate 10 to pivot in the direction indicated by arrows 21. This pivoting is made possible by the flexibility of the structure 7 due to the hinges 8.

The pivoting of the top plate 10 gives rise in turn to displacement of the oblique pushers 9.

Since the ends 13 of the oblique pushers 9 are secured to the rod 3, positive elongation of the material 6a causes the rod 3 to move in the direction indicated by arrow 20.

This actuates displacement of a valve in a hydraulic circuit located at the end of the rod 3.

It will readily be understood that it is possible to reverse the direction in which voltage is applied to the active materials 6a and 6b. It is then possible to obtain positive elongation of the material 6b and negative elongation of the material 6a. It will be understood that the top plate then pivots in the direction opposite to arrows 21, and that the rod 3 moves in the direction opposite to that given by arrow 20.

The displacement of the valve at the end of the rod 3 will therefore be reversed relative to the first voltage-application stage and hydraulic flow will thus be modulated.

Displacement of the rod 3 is easily modulated by the elongation amplitude of the materials 6a and 6b, thus enabling the hydraulic flow rate in the circuit to be modulated accurately.

Advantageously, the active materials 6a and 6b and the voltages applied in the various stages enable the rod 3 to move over a stroke having an amplitude of ±0.5 mm.

Advantageously, the force exerted at the end of the rod 3 is equal to 50 N.

The fact that the active materials 6a and 6b elongate in antisymmetrical directions relative to a longitudinal axis 31 of the rod 11 makes it possible to obtain automatic compensation of the neutral or equilibrium position. This compensation takes place regardless of temperature.

For zero applied voltage, the rod 3 naturally returns to a stable central position. Thus, this system provides good stability for the neutral position.

The deformable structure 7 enables the elongation of the active materials 6a and 6b to be amplified greatly.

The housing 2 is placed inside a hydraulic circuit. The static pressure of the liquid surrounding the housing 2 may therefore be very high. Consequently, the operation of the diaphragm 4 might be affected if there is nothing inside the housing 2 to counteract said pressure.

Figure 3:
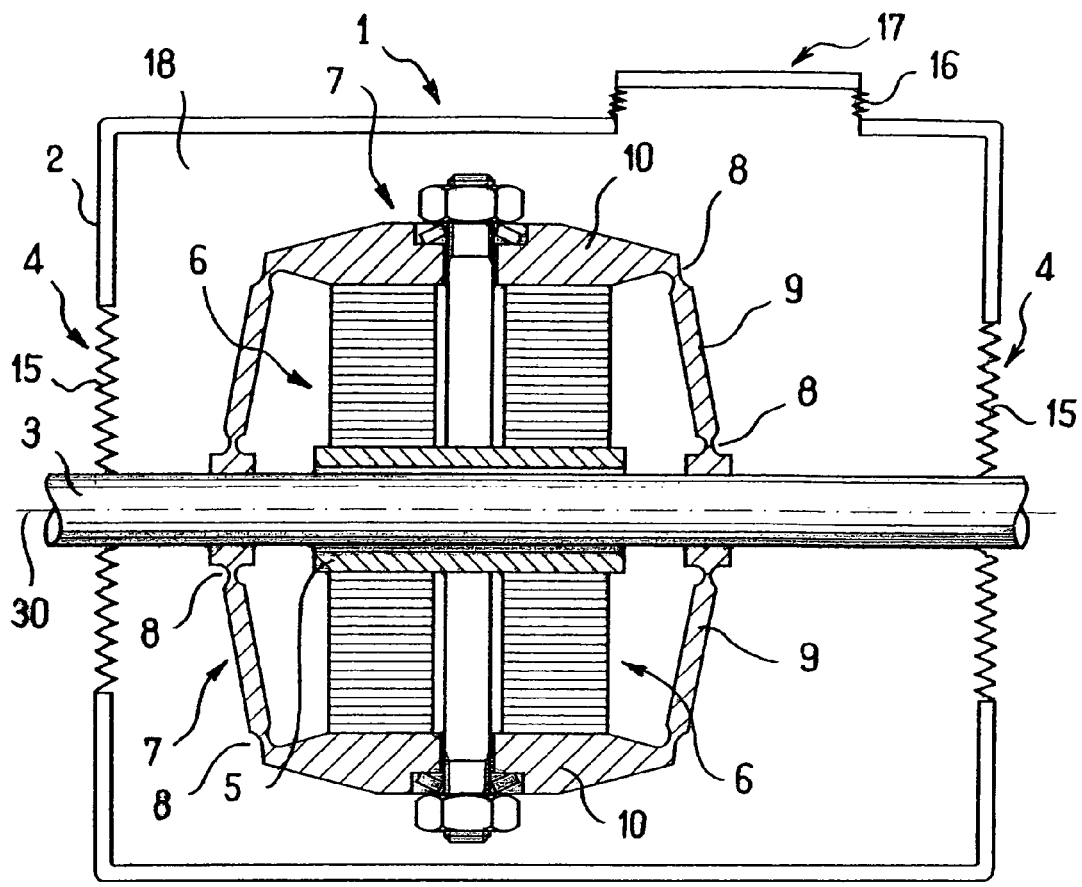
FIG. 3 is a diagrammatic longitudinal section view of a possible embodiment of a valve control device including a filling liquid inside its housing, the device having means allowing the filling liquid to expand thermally.
Figures 4A, 4B:
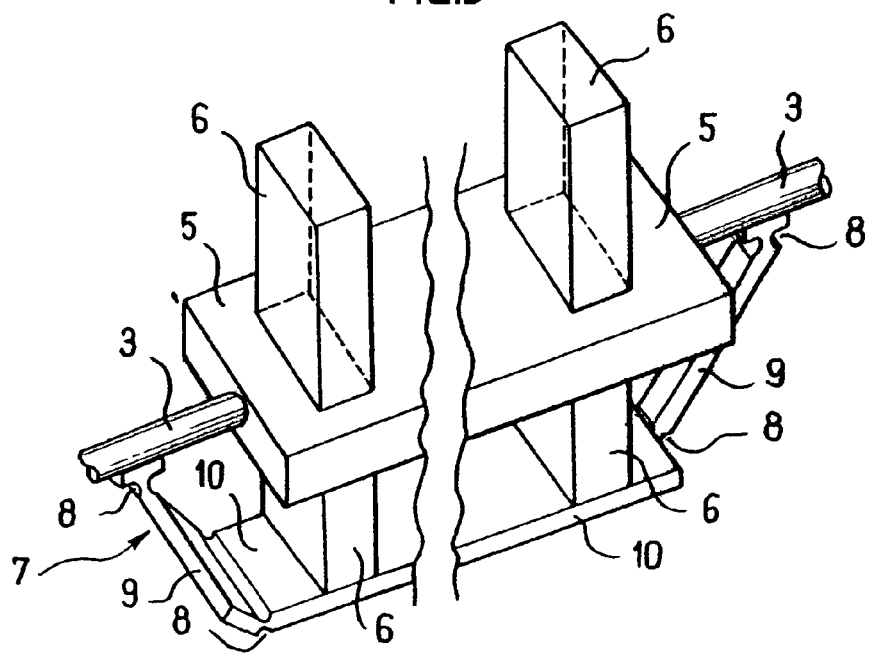
FIG. 4a is a diagrammatic perspective view of a first possible embodiment of a structure for actuating the moving part.
FIG. 4b is a diagrammatic perspective view of a second possible embodiment of a structure for actuating the moving part.

Thus, in order to counter the large static pressure of the liquid surrounding the housing 2, FIG. 3 shows that in a variant of the embodiment shown in FIG. 2, the inside of the housing 2 is advantageously filled with a counterpressure liquid 18, this liquid being non-aggressive for the means for actuating the rod 3.

When the inside of the housing 2 is filled with a liquid 18, and in order to accommodate the very large thermal expansion of the filling liquid 18 relative to the walls of the housing 2, FIG. 3 shows that bellows 15 are provided at at least one diaphragm 4 in order to enable the filler liquid to expand.

In a variant, at least one expansion chamber is provided for the filler liquid 18. By way of example, the expansion chamber comprises a cutout 17 in a portion of the wall of the housing 2, this cutout being connected to the housing 2 by a bellows 16. Thermal expansion of the filler liquid 18 is thus accommodated by moving the part 17.

The bellows 15 of the diaphragms 14 are optionally associated with one or more expansion chambers.

Preferred Embodiment

Figure 5:
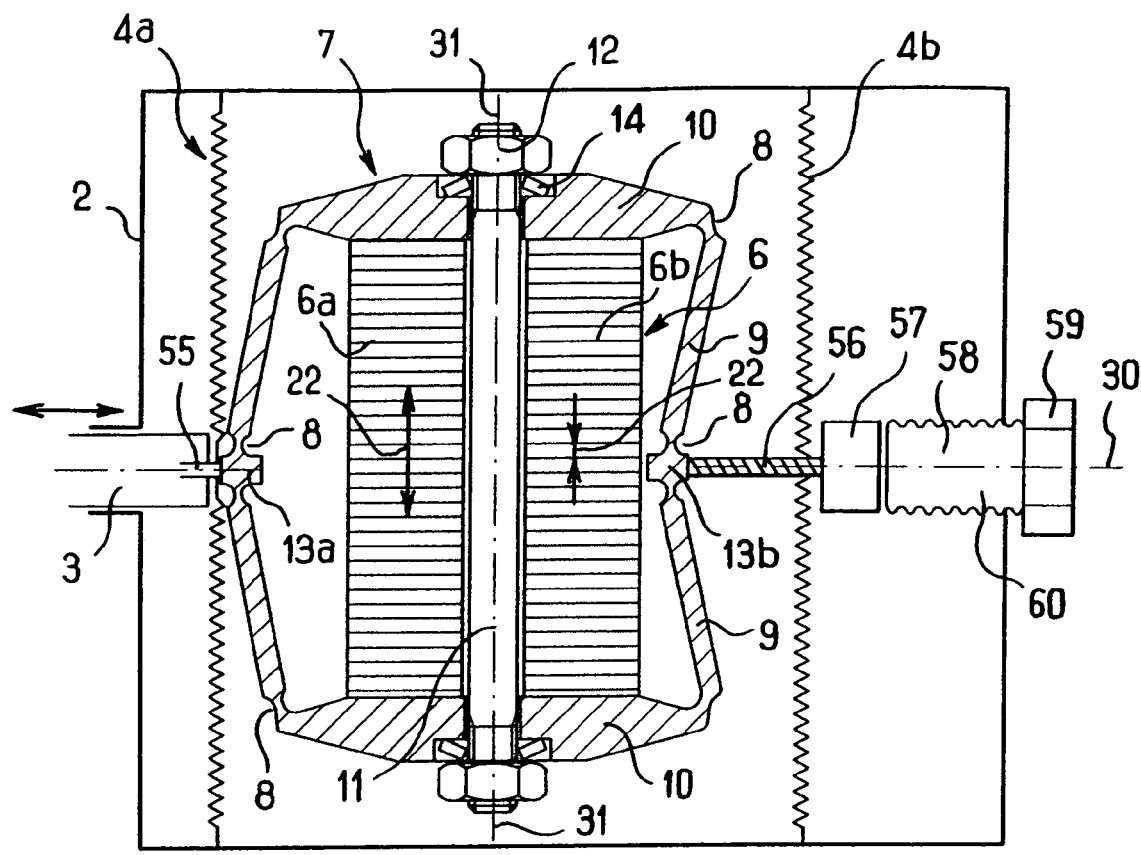
FIG. 5 is a diagrammatic longitudinal section view of another possible embodiment of a device for displacing valves, this device being placed inside the device shown in FIG. 1.

FIG. 5 is a diagram of a second possible embodiment of the means for actuating the rod 3.

In this figure, elements similar to those of FIGS. 2 to 4b are given identical numerical references.

As for the first embodiment, the actuator means are symmetrical about the plane 30 containing the longitudinal axis of the rod 3.

However, in the second embodiment, the actuator rod 3 is no longer placed inside an outer housing 2, and the housing 2 no longer has internal sliding means. One of the ends of the rod 3 is situated on the left of the device shown in FIG. 5.

As shown in FIG. 5, the displacement means comprises means 6 for deforming two structures 7 extending on opposite sides of the plane 30 and perpendicularly to the plates 10 of the structures 7, i.e. substantially parallel to a prestress element 11 as described in greater detail below.

The means 6 comprise at least two blocks of active material 6a and 6b. Each block 6a or 6b may comprise a pair of blocks stacked one on the other.

The active materials 6a and 6b may be of the electrostrictive, magnetostrictive, or piezoelectric type. They are advantageously made of piezoelectric materials. The blocks 6a and 6b are biased in the direction of the major dimension.

Each structure 7 has a top plate 10 which, in the rest position, extends substantially parallel to and at a distance from the plane 30. Each structure 7 also has lateral pushers 9 made integrally with the top plate 10 and extending obliquely towards the plane 30.

The pushers 9 may alternatively be separate pieces fitted to the plates 10 via one or more flexible metal blades, or by blades made of a material other than metal, the blades serving to provide resilient links between the pushers 9 and the associated plates 10.

The pushers 9 are geometrically antisymmetrical about a longitudinal plane 30 containing the axis of the prestressed means 11, the plane 31 being perpendicular to the plane of FIG. 5 and to the plate 10. Thus, starting from the plates 10, the pushers extend towards the rod 3, from right to left for the device as shown in FIG. 5.

As in the first embodiment, the prestress means preferably comprise a threaded rod 11 co-operating with a nut 12 and a washer 14. The nut 12 presses the washer 14 against the outside face of the top plate 10 so as to prestress the parts 7 and 6 against each other. Compressing the blocks 6a and 6b avoids them suffering damage. However, the prestress means are sufficiently flexible to avoid impeding movement of the plates 10.

The structures 7 which are symmetrical relative to each other are secured to each other by blocks 13 situated at one end of each pusher 9.

The pushers 9 are secured to each other so as to form junction blocks 13.

Because of the symmetry about the plane 30 and the antisymmetry about the plane 31, each pair of pushers 9 forms an angle that opens out in the same direction, to the right in FIG. 5, but which may be of value that differs depending on torque, as described below.

Each structure 7 has portions 8 of narrow section at the junctions between the top plate 10 and the oblique pushers 9 and between the oblique pushers 9 and the blocks 13. The portions 8 of narrow section thus form locations of great flexibility in the structure 7, thereby forming hinge type means.

When the pushers 9 are fitted to the plate 10, the hinge 8 is formed by a link blade between the pusher 9 and the plate 10.

It is also possible to provide for the pushers 9 to be connected to the junction blocks 13 via at least one respective flexible blade made of metal, or made of a material other than metal, the blade providing the resilient connection between each pusher 9 and the corresponding blocks 13.

It can thus be understood that the flexible blades perform the same function as the portions of narrow section in the pushers 9, forming resilient hinges without play, that give flexibility to each structure 7.

The connection blocks 13 are both connected to link means leading to other mechanical parts that pass through diaphragms 4 situated to the right and to the left of the structures 7.

The block 13a is movable longitudinally in the plane 30 and is connected to a connection rod 55 which passes through the diaphragm 4a. The rod 55 is itself connected to the valve control rod 3.

The block 13b is fixed relative to the housing 2 while the device is in use. It is connected to a rod 56 situated on the axis of the rod 55 and on the axis of the rod 3 in the plane 30. The rod 56 passes through the diaphragm 4b.

At its end remote from the block 13b, the rod 56 has a head 57. The head 57 comes into abutment against the end of the threaded shank 58 of a screw 60. The head 59 of the screw 60 is situated outside the housing 2. The screw 60 enables the displacement zero of the rod 3 to be set. This zero setting of the displacement of the rod is performed by moving the structures 7 in translation parallel to the plane 30. The structures 7 float relative to the housing 2 but they are connected to the inside of the housing 2 via the diaphragms 4 which allow the structures 7 to move parallel to the plane 30.

It will be understood that once the zero position has been set, the block 13b is fixed relative to the housing 2. The screw 60 is stationary relative to the housing because of a tapped portion, and also the rod 56 and the head 57, both of which are secured to the blocks 13b, come into abutment against the end of the screw 60.

The diaphragms 4 are flexible along the displacement axis of the rod 3 and stiff transversely relative thereto. The structures 7 therefore do not move in any transverse direction.

The diaphragm 4a thus enables the rod 55 to move, and consequently enables the rod 3 to move. The diaphragm 4a and the diaphragm 4b enable the structures 7 to be moved in translation in order to set the zero position of the system.

Figure 6A:
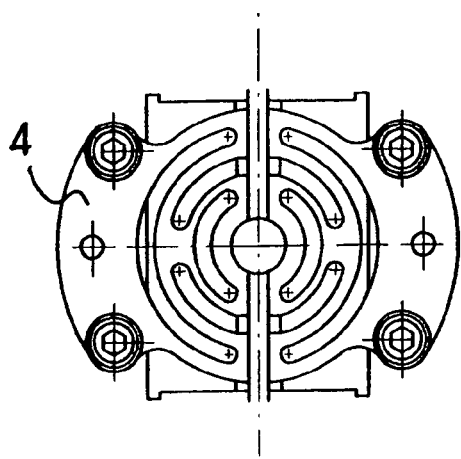
FIGS. 6a and 6b are diagrams of an embodiment of a diaphragm fixed on a device as shown in FIG. 5.
Figure 6B:
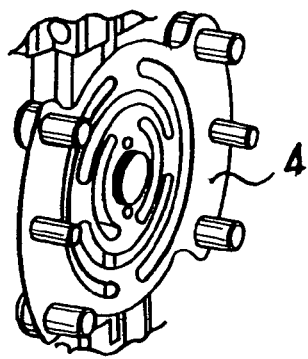

FIGS. 6a and 6b are diagrams showing possible embodiments for the diaphragms 4 of the invention. It can be seen in these figures that the diaphragms 4 do not necessarily provide the device with sealing.

Sealing can be provided elsewhere by other devices outside the housing 2.

In addition, sealing is not necessary in all applications of the device of the invention.

The mechanism whereby the structure 7 deforms and the rod 3 is displaced in a device constituting the second embodiment of the invention is described below with reference to FIG. 5 and with reference to FIGS. 7a to 7c.

FIG. 5 shows that the elongation axes of the active materials 6a and 6b are normal to the axes of the rod 3 and of the plates 10 of the structures 7.

Figure 7A:
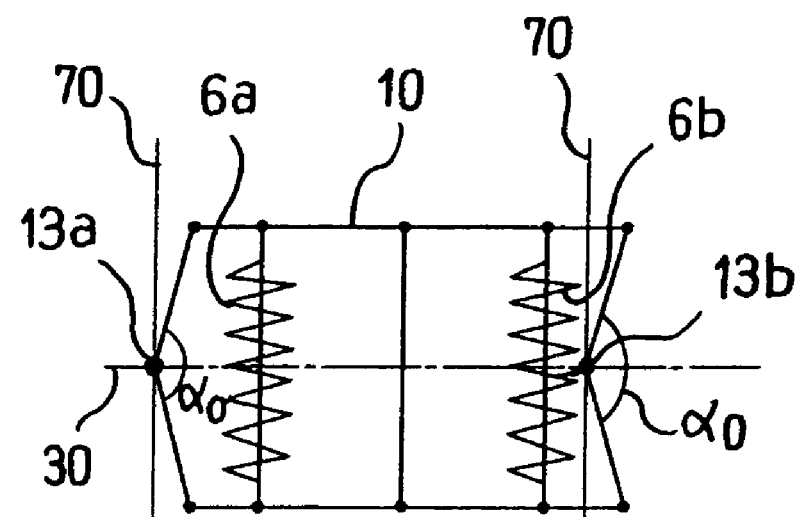
FIGS. 7a to 7c show various operating states of a FIG. 5 device.
Figure 7B:
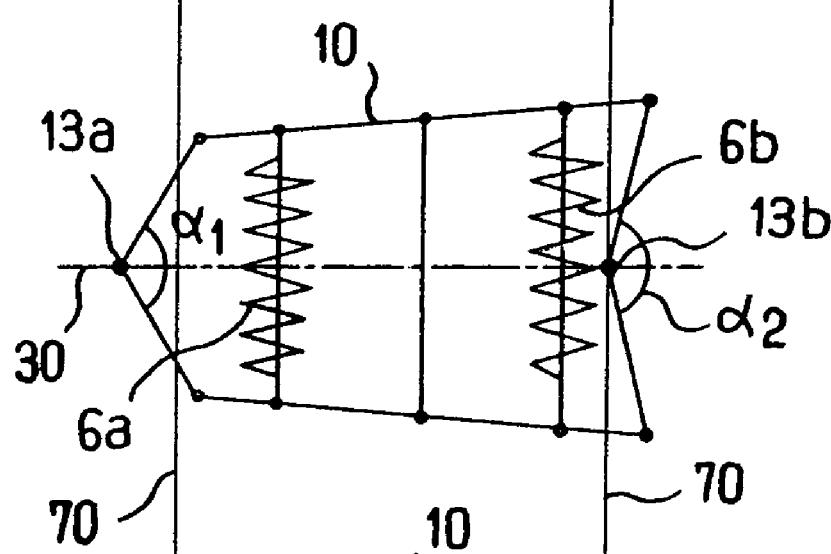
Figure 7C:
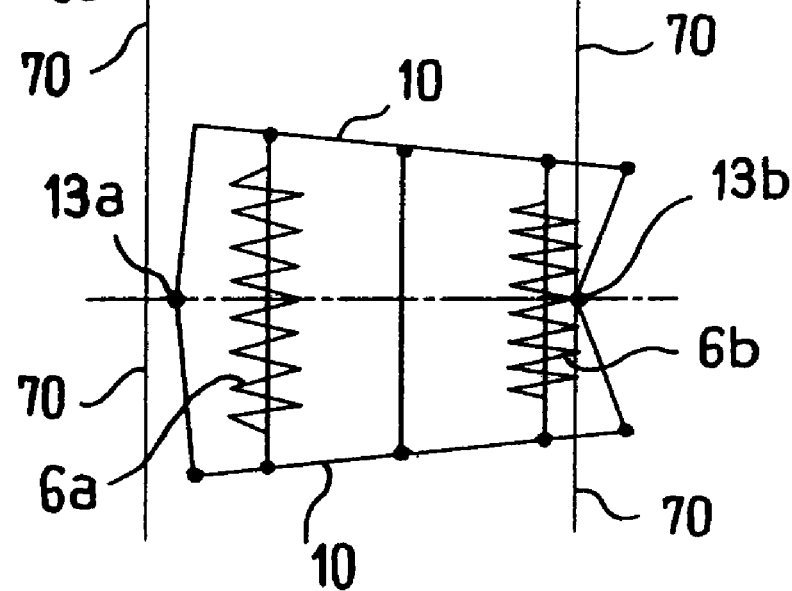

FIGS. 7a to 7c thus show three different extension states for the blocks 6a and 6b, and consequently three different states for the rod 3.

FIG. 7a shows the initial state or rest position of the device. The blocks 6a and 6b are not powered electrically. Both plates 10 are therefore parallel to each other and to the plane 30.

The rod 3 is therefore in its zero position, and it is recalled that this position can set by acting on the screw 60 which enables the structures 7 to be moved in translation due to the longitudinal flexibility of the diaphragms 4a and 4b.

The initial angle made between the pushers 9 of the two structures 7 is marked $\alpha_0$. The initial distance between the blocks 13a and 13b is identified by lines 70.

FIG. 7b shows that applying electric fields of equal magnitude and opposite sign to the two groups of blocks 6a and 6b causes the plates 10 to tilt. The two plates 10 remain symmetrical relative to each other about the plane 30.

Tilting of the plates 10 has the consequence of changing the angles between the pushers 9.

The pair of pushers 9 connected to the block 13a forms an angle $\alpha_1$ while the pair of pushers 9 connected to the block 13b forms an angle $\alpha_2$. The angles between the pairs of pushers vary with opposite signs, i.e. if $\alpha_1$ decreases, then $\alpha_2$ increases, and vice versa, and the amount of variation in each of the angles $\alpha_1$ and $\alpha_2$ is different.

Since the block 13b is fixed relative to the housing 2, varying the angles between the pushers has the consequence of varying the distance between the blocks 13a and 13b. It can thus be seen that the block 13a is advanced from its initial position as identified by the line 70. The rod 3 is therefore displaced to the left in FIG. 7b. It is recalled that displacement of the block 13a is due to the plates 10 tilting under drive from the blocks 6a and 6b.

In FIG. 5, arrows 22 show the direction in which the active materials 6a and 6b lengthen when voltage is applied differently during another stage, which stage is also shown in FIG. 7c. This power supply is opposite to that shown in FIG. 7b. The plates 10 therefore tilt in the opposite direction and the block 13a is moved to the right in FIG. 7c.

The displacement distance of the block 13a as a function of the applied voltage can be evaluated approximately by a geometrical relationship between the three angles $\alpha_0$, $\alpha_1$, and $\alpha_2$. It is also influenced by the elastic deformations that arise in the structure when an external force is applied.

The rod 3 is movable in translation along the longitudinal axis of the housing 2. At least one of its ends is connected to a valve in a hydraulic circuit. This makes it possible, for example, to adjust the pressure, or the flow rate of a hydraulic fluid by moving the rod.

By way of example, the device may be used in brake servo-controls or in actuators for flight controls.

Advantageously, the active materials 6a and 6b, and the voltages applied during the various stages enable the rod 3 to move through a stroke having an amplitude of ±0.5 mm.

Advantageously, the force generated by the system and exerted at the end of the rod 3 is equal to or greater than 50 N.

As for the first embodiment, the fact that the directions in which the active materials 6a and 6b lengthen are antisymmetrical relative to the longitudinal axis 31 of the rod 11 makes it possible to obtain automatic compensation of the neutral or equilibrium position. This compensation takes place regardless of temperature.

When zero voltage is applied, the rod 3 returns naturally to a stable central position. Thus, the system provides good stability for the neutral position.

The deformable structure 7 enables the elongations of the active materials 6a and 6b to be amplified greatly.

In addition, in the second embodiment, the inclination of one of the pairs of pushers 9 is reversed relative to that of the first embodiment.

Furthermore, the displacements of the blocks 13a and 13b are decoupled because the rod 3 no longer passes through the center of the structures 7 and the blocks 13a and 13b are no longer both connected to the rod 3.

These two characteristics present two main advantages.

Firstly, the deformations at the ends are accumulative so that the resulting displacement is greater.

Secondly, the internal forces of the device are smaller.

In addition, the fact that zero position is simple to adjust by means of a screw acting on the displacement means via tapping in the housing constitutes another advantage compared with the first embodiment of the device.

The second embodiment is more compact and has a smaller number of interfaces in series with the active materials, thereby minimizing losses in the stiffness of interfaces. This increases the precision with which the rod 3 can be moved.

It is also possible to increase the section of the active materials, thus making it possible to increase the stiffness of the device.

The second embodiment may naturally include a counterpressure liquid and expansion bellows as in the first embodiment.

The first embodiment may also have connection blades instead of portions of narrow section in the pushers 9. It is thus possible to continue having a resilient hinge without play giving flexibility to each structure 7.

The device of the invention has numerous advantages.

The means enabling the structure 7 to deform comprise only the portions 8 of narrow section. There are no joints. Consequently, there is no wear of parts nor is there any appearance of play as a result of use. Good accuracy in displacement is thus obtained, as is a long lifetime.

The active materials 6a and 6b are in the form of a solid block which enables the assembly as a whole to be made very rigid, and also enables a large force to be delivered by the rod 3.

The valve actuator device thus delivers a large amount of energy for a system that is compact.

The size of the system as represented by double-headed 32 is advantageously 50 mm. The size of the device in directions normal to the plane 30 is likewise 50 mm, the portion symmetrical to that shown in FIG. 2 complying within these dimensions. Size is even smaller for the second embodiment.

It will be understood from FIG. 3 that the device has at least four blocks of active material. This redundancy in active material blocks serves further to provide safety in the event of a block of active material not functioning correctly. The system can continue to function even in the event of one of its blocks breaking down.

Advantageously, the ceramics of the active materials are multi-layer materials. They thus make it possible to apply low voltages.

What is claimed is:

1. A device for displacing a moving part along a longitudinal axis relative to a housing, said device being symmetrical about a plane extending longitudinally relative to the moving part, the device comprising:

two structures, each structure comprising a plate and two oblique pushers linked to the plate, a pusher being secured at one of its ends to the moving part and to a diaphragm connected to the inside of the housing and another pusher being secured at one of its ends to means for displacing the structure along the longitudinal axis relative to the housing for adjusting a displacement zero position of the moving part and to a diaphragm connected to the inside of the housing, and two blocks of active material extending between the plates, the elongation directions of the blocks being antisymmetrical about an axis substantially perpendicular to the displacement axis of the moving part, wherein the structures are flexible and suitable for displacing the moving part by deforming as a function of the elongation of the blocks.

2. The device according to claim 1, wherein the pushers are integral with the plates.

3. The device according to claim 1, wherein the ends of the pushers are secured to the moving part, the means for displacing the structure and to the diaphragms via rods.

4. The device according to claim 1, wherein the respective pushers of each structure are secured to each other by junction blocks.

5. The device according to claim 4, wherein the structure includes portions of narrow section between the oblique pushers and the junction blocks connected to the moving part or the means for displacing the structure, these portions of narrow section being suitable for imparting flexibility to each structure.

6. The device according to claim 4, wherein one junction block is connected to the moving part and the other junction block is fixed relative to the housing external to the structures, the fixed block being secured to a rod coming into abutment against a screw for adjusting a displacement zero position of the moving part.

7. The device according to claim 1, wherein the structure includes portions of narrow section between the plate and the oblique pushers, chase portions of narrow section being suitable for imparting flexibility to each structure.

8. The device according to claim 1, including means suitable for prestressing the displacement means between the plates.

9. The device according to claim 1, wherein the pushers are geometrically antisymmetrical relative to a plane perpendicular to the plates.

10. The device according to claim 1, wherein the diaphragms are flexible along the displacement axis of the moving part and stiff transversely relative thereto.

11. The device according to claim 1, wherein the housing is filled with a counterpressure liquid.

12. The device according to claim 11, including at least one expansion chamber for the filler liquid.

13. The device according to claim 12, wherein each expansion chamber includes a cutout constituting a portion of the wall of the housing, said cutout being connected to the housing by bellows.

14. The device according to claim 1, wherein at least one diaphragm includes bellows.

15. A device for displacing a moving part along a longitudinal axis relative to a housing, said device being symmetrical about a plane extending longitudinally relative to the moving part, the device comprising two structures, each structure comprising a plate and two oblique pushers linked to the plate and to the moving part, two diaphragms between the moving part and the housing, the diaphragms being flexible along the displacement axis of the moving part and stiff transversely relative thereto and suitable for providing sealing between the moving part and the housing, four blocks of active material extending between the plates and means for the sliding of the moving part therein, the means for sliding being fixed to the housing, with the elongation directions of the blocks being antisymmetrical about an axis substantially perpendicular to the displacement axis of the moving part, wherein the structures are flexible and suitable for displacing the moving part by deforming as a function of the elongation of the blocks.

16. The device according to claim 15, wherein the pushers are integral with the plates.

17. The device according to claim 15, wherein the structure includes portions of narrow section between the plate and the oblique pushers, these portions of narrow section being suitable for imparting flexibility to each structure.

18. The device according to claim 15, wherein the structure includes portions of narrow section between the oblique pushers and junction blocks connected to the moving part, these portions of narrow section being suitable for imparting flexibility to each structure.

19. The device according to claim 15, including means suitable for prestressing the displacement means between the plates.

20. The device according to claim 15, wherein the pushers are geometrically symmetrical relative to a plane perpendicular to the plates.

21. The device according to claim 15, wherein the housing is filled with a counterpressure liquid.

22. The device according to claim 21, including at least one expansion chamber for the filler liquid.

23. The device according to claim 22, wherein each expansion chamber includes a cutout constituting a portion of the wall of the housing, said cutout being connected to the housing by bellows.

24. The device according to claim 15, wherein at least one diaphragm includes bellows.

25. A device for displacing a moving part along a longitudinal axis relative to a housing, said device being symmetrical about a plane extending longitudinally relative to the moving part, the device comprising:

two structures that are secured to said moving part and elements of active material comprising at least two blocks extending between inside walls of each structure, with the elongation directions of the blocks being antisymmetrical about an axis substantially perpendicular to the displacement axis of the moving part, at least one diaphragm on either side of the blocks, the diaphragms being flexible along the displacement axis of the moving part and stiff transversely relative thereto, and at least one expansion chamber for a filler liquid, wherein the two structures are flexible and suitable for displacing the moving part by deforming as a function of the elongation of the blocks.

26. A device for displacing a moving part along a longitudinal axis relative to a housing, said device being symmetrical about a plane extending longitudinally relative to the moving part, the device comprising:

two structures that are secured to said moving part and elements of active material comprising at least two blocks extending between inside walls of each structure, with the elongation directions of the blocks being antisymmetrical about an axis substantially perpendicular to the displacement axis of the moving part, at least one diaphragm on either side of the blocks, the diaphragms being flexible along the displacement axis of the moving part and stiff transversely relative thereto, and at least one expansion chamber for a filler liquid, wherein the two structures are flexible and suitable for displacing the moving part by deforming as a function of the elongation of the blocks, and the at least one expansion chamber includes a cutout constituting a portion of the wall of the housing, said cutout being connected to the housing by bellows.

* * * * *